United States Patent [19]

Sebelik et al.

[11] 4,108,768
[45] Aug. 22, 1978

[54] METHOD OF CLARIFYING INDUSTRIAL WASTE WATER

[75] Inventors: Robert V. Sebelik, Forest Park; Wilfried Schaefer, Des Plaines, both of Ill.

[73] Assignee: Winchester Chemical Co., Franklin Park, Ill.

[21] Appl. No.: 718,353

[22] Filed: Aug. 27, 1976

[51] Int. Cl.² .............................................. B01D 17/04
[52] U.S. Cl. ...................................... 210/43; 210/44; 210/53
[58] Field of Search ............... 210/DIG. 26, DIG. 27, 210/44, 47, 43, 40, 51–53

[56] References Cited

U.S. PATENT DOCUMENTS

| 3,347,786 | 10/1967 | Baer et al. | 210/47 |
| 3,677,940 | 7/1972 | Fujimoto et al. | 210/44 |
| 3,769,207 | 10/1973 | Baer | 210/44 |
| 3,816,276 | 6/1974 | Ichiki et al. | 210/44 |
| 3,965,001 | 6/1976 | Irani et al. | 210/DIG. 27 |

FOREIGN PATENT DOCUMENTS

| 1,069,803 | 11/1959 | Fed. Rep. of Germany | 210/47 |
| 2,160,312 | 6/1973 | Fed. Rep. of Germany | 210/47 |

Primary Examiner—Charles N. Hart
Assistant Examiner—Benoit Castel
Attorney, Agent, or Firm—Richard H. Anderson

[57] ABSTRACT

An industrial waste water containing hexane soluble impurities is adjusted in pH to a value of at least 11.6 and thereafter calcium chloride is added to that waste water in an amount of at least 1,700 parts per million, based on the total weight of industrial waste water. A metal hydroxide floc results which includes a substantial portion of the hexane soluble impurities attached to or incorporated in the floc. The floc can be agglomerated with conventional coagulants and then separated from the clarified waste water. The calcium chloride will react at this very high pH to effectively flocculate a substantial portion of the oils and greases (hexane solubles) in addition to a substantial portion of the contaminating metal ions in the industrial waste water.

8 Claims, 2 Drawing Figures

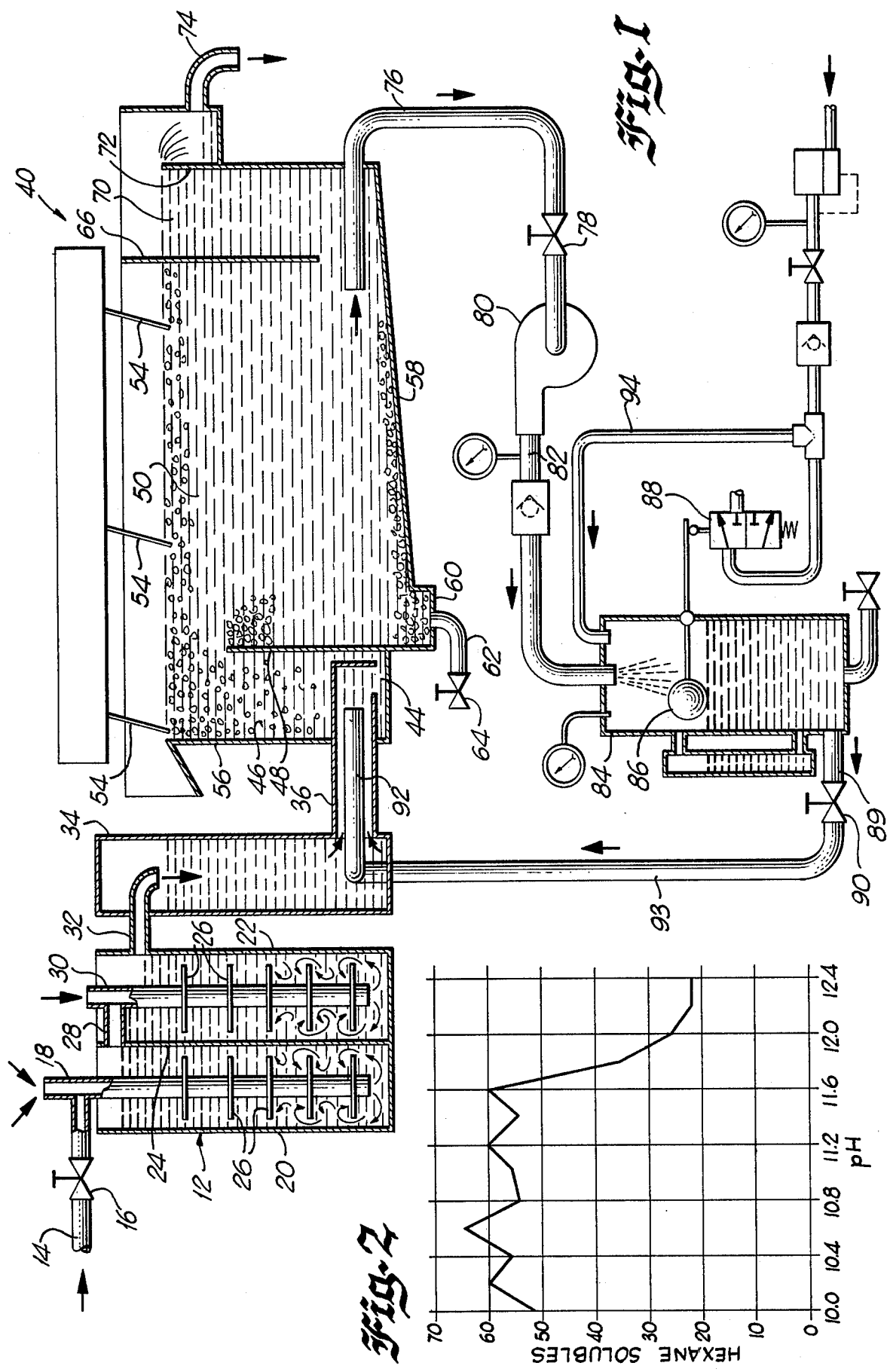

METHOD OF CLARIFYING INDUSTRIAL WASTE WATER

FIELD OF THE INVENTION

This invention relates to a method of purifying industrial waste waters and more particularly relates to a method of removing oils and greases (hexane solubles) and metal ions from laundry waste waters. It has been found that when an industrial waste water containing hexane soluble impurities and, more particularly, a laundry waste water, is adjusted in pH to a value of at least 11.6 and thereafter calcium chloride is added to that waste water in an amount of at least 1,700 parts per million, based on the total weight of laundry waste water, a substantial portion of the hexane solubles will attach to or be incorporated in a metal hydroxide floc. The floc can be agglomerated with conventional coagulants and then separated from the clarified waste water.

The calcium chloride will react at this very high pH to effectively flocculate a substantial portion of the oils and greases (hexane solubles) in addition to a substantial portion of the contaminating metal ions in the laundry waste water. Calcium chloride has been the only chemical found to be effective at this very high pH level of at least 11.6 and it is necessary that the laundry waste water be adjusted in pH to at least 11.6 for the calcium chloride to become effective in clarifying the laundry waste water.

PRIOR ART

As set forth in the Halton U.S. Pat. No. 3,147,217, waste water normally encountered in laundry operations has a pH of between 10.0 and 11.0. To flocculate the oils and greases and other impurities encountered in such laundry waste water, it is common to reduce this pH, such as by adding sulfuric acid, to a pH in the range of between about 7.2 and 6.5. When forming the floc, the pH is not permitted to exceed 7.2 ordinarily with 7.3 being the usual top limit permissible and it is preferred to keep the pH between 6.8 and 7.0.

The Bready et al. U.S. Pat. No. 3,192,155 also sets forth a common method for clarifying laundry waste waters and also teaches progressively decreasing the pH of the laundry waste water to the acid side.

Other patents disclose the use of metallic hydroxides at a pH in the range of about 3–10 to form flocculant hydroxides in the clarification of industrial wastes, but prior to the present invention no process has provided effective flocculation of oils and greases from an industrial waste water at a pH higher than 11.

In accordance with the present invention, calcium chloride has been found to be effective in flocculating oils, greases and metal ions from contaminated laundry waste waters at a waste water pH of at least 11.6. Quite surprisingly, as the pH is raised starting at about 10, the removal of oils and greases is substantially constant until a pH of 11.6 is reached. At a pH of 11.6 the amount of remaining oils and greases (hexane solubles) rapidly and consistently drops and levels off at a pH in the range of about 12.2–12.4 (FIG. 2).

SUMMARY OF THE INVENTION

An object of the present invention is to provide a new and improved method of purifying industrial waste waters.

Another object of the present invention is to provide a method of removing hexane soluble (water insoluble) impurities from industrial waste waters and more particularly from laundry waste waters.

Another object of the present invention is to provide a new and improved method of removing contaminating metal ions from water.

Another object of the present invention is to provide a method of removing contaminants from waste waters by adjusting the pH of the waste water to a value of at least 11.6, adding calcium chloride to form a floc and then agglomerating and removing the floc containing contaminants.

Another object of the present invention is to provide a new and improved method of removing contaminants from a waste water at a high pH by forming a floc with calcium chloride and thereafter agglomerating or coagulating the floc and contaminants with an organic polymer coagulant.

Accordingly, in accordance with the present invention, an industrial waste water is adjusted in pH to a value of at least 11.6 followed by the addition of calcium chloride in an amount sufficient to cause formation of a calcium hydroxide floc. The amount of calcium chloride addition should be sufficient to reduce the hexane soluble content of the effluent, after removal of the floc, to a value below about 100 milligrams per liter of effluent. To realize the full advantage of the present invention, the amount of $CaCl_2$ addition should be sufficient to reduce the hexane soluble content of the effluent, after floc removal, to a value below about 50 milligrams per liter of effluent. The calcium hydroxide floc is coagulated or agglomerated by the addition of any well-known metal hydroxide coagulant(s), such as a high molecular weight polyacrylamide, and the coagulated floc or floc clumps are removed in any well-known manner such as by floc floatation and skimming, as will be described in more detail in the preferred embodiment.

In accordance with an important feature of the present invention, calcium chloride is used to form a calcium hydroxide floc at a pH of at least 11.6. At this high pH, the oil and grease (hexane soluble) pollutants in an industrial waste water become attached to, or penetrate into, the calcium hydroxide floc so that coagulation and removal of the floc lowers the hexane soluble content to effluent acceptable values of less than 100 milligrams per liter and preferably lower than 50 milligrams per liter. It is quite surprising that at a pH of 11.6 or higher the hexane soluble content of an industrial waste water containing a very high oil or grease content can be clarified to a hexane soluble content less than about 25 milligrams per liter whereas at pH values less than 11.6 the hexane soluble content cannot be reduced less than 50 milligrams per liter. (see FIG. 2). The addition of other calcium compounds such as $Ca(OH)_2$ and the like have not been found to be as effective as calcium chloride at a pH of at least 11.6 for removal of hexane solubles from an industrial waste water. In situ formation of other metal hydroxide flocs are similarly not as effective in accumulating the hexane solubles from an industrial waste water at a pH of at least 11.6. Apparently, the formation of the calcium hydroxide floc from $CaCl_2$, in situ, within mixing vessel 12, at a pH of at least 11.6, allows for easier attachment of the hexane solubles to the floc.

To realize the full advantage of the present invention, the addition of a water soluble organic polymeric substance can fully coagulate or agglomerate the calcium hydroxide floc into floc clumps. Any of the well-known polymeric substances used to agglomerate metal hydroxides into clumps from water can be used in the practice of the present invention. The following examples are not intended to limit the scope of the present invention with regard to the coagulants useful for agglomerating metal hydroxides. The coagulant can be many of those set forth in U.S. Pat. No. 3,445,187, such as: a homopolymer comprising polyacrylic acid or salts of polyacrylic acid, or a copolymer, or terpolymer or higher multi-cmponent polymer wherein at least 80% of the polymer structure is made up of acrylic acid or acrylic acid salt groups. The polyacrylate salt may be either an alkali metal, alkaline earth metal or ammonium salt.

Besides the homopolymers or polyacrylic acid or polyacrylate salts, another preferred species is a water-soluble copolymer derived from copolymerization of a monomer mixture containing 80-99% by weight of acrylic acid or acrylate salt, and most preferably, alkali metal acrylate salt and 1-20% by weight of an additional and different monomer comprising an ethylenically unsaturated polymerizable compound containing a hydrophilic group in a side chain attached to the unsaturated hydrocarbon structure.

Particularly useful homopolymers or copolymers of the type described above should have a molecular weight in excess of 50,000, and more preferably in excess of 100,000. Excellent additive polymers have molecular weights even as high as ten million.

A wide variety of one or more different monomers may by copolymerized or terpolymerized in amounts up to about 20% with acrylic acid or salts thereof. Typical comonomers include acrylamide, methacrylamide, acrylonitrile, the lower alkyl esters of acrylic and methacrylic acids, vinyl methyl ether, methacrylic acid salts, maleic anhydride and salts thereof, isopropanyl acetate, itaconic acid, vinyl acetate, alpha-methyl styrene, styrene, fumaric acid, aconitic acid, citraconic acid, amides of any of the foregoing acids, alkali metal derivatives (e.g. sodium, potassium and lithium), alkaline earth metal derivatives (e.g., magnesium, calcium, barium and strontium), and ammonium salts of any of the above monomeric acids or others, the partial alkyl ester amides and salts of various polycarboxylic acids, vinyl toluene, chlorostyrene, vinyl chloride, vinyl formate, ethylene, propylene, isobutylene, etc. Of the just-mentioned comonomers, greatly preferred materials among these contain a hydrophilic group in a side chain off the ethylenically unsaturated hydrocarbon group. Those monomers which do not contain such hydrophilic solubilizing group should be used in lesser amounts of say about 1-5% by weight based on total weight of monomer present.

Still other monomeric substances which may be employed in conjunction with the acrylic acid or acrylic acid salt constituent include materials such as sulfoethyl acrylate, carboxyethyl acrylate, diethyl vinyl phosponate, crotonic acid or salts thereof, vinyl sulfonate, or salts thereof, vinyl alcohol and vinyl aryl hydrocarbons containing solubilizing groups such as sulfonates, and the like.

Other useful polymers incude: Cyanamer P26. — a relatively low molecular weight anionic copolymer of acrylamide and acrylic acid. It is a white, odorless, free-flowing solid which can be readily dispersed and dissolved in cold water. The properties of the dry polymer are as follows: ash, 7.5%; bulk density, 30 lb/cu.ft.; volatiles, 5.0%; Browning range, 250°-255° C.; acrylamide monomer, 0.2%; pH (1% solution), 5.5. Cyanamer P250 — a homopolymer of acrylamide that is essentially nonionic. It has a molecular weight of approximately 5 million to 6 million, but can be readily dispersed in water and has a high rate of solution. The properties of the dry polymer are as follows: ash, 0.5%; bulk density, 30 lb./cu.ft.; volatiles, 5.0%; Browning range, 261°-265° C.; acrylamide monomer, 0.05%; pH (1% solution), 3.7. Other useful synthetic polymers are described in U.S. Pat. Nos. 3,524,811 and 3,147,218. Also useful are polysaccharides as described in U.S. Pat. No. 3,285,849 and starch or graft copolymers of starch as described in U.S. Pat. No. 3,635,857. It is preferred to use a water soluble, anionic polymer o acrylamide having a molecular weight in the range of 3-5 million.

It has been found that calcium chloride should be added to laundry waste water in an amount of at least 1,700 milligrams per liter to provide enough calcium hydroxide floc for absorption of or attachment to at least 90% and preferably 94-98% of the hexane solubles originally in the industrial waste water. It is preferred to add calcium chloride in an amount in the range of 2,000-5,000 milligrams per liter of the influent waste water. The coagulant is added in an amount effective to coagulate substantially all of the calcium hydroxide floc. The amount of coagulant may vary depending on its composition but the amount can easily be determined visually and generally falls within the range of 1-5 milligrams per liter of waste water.

In addition to removal of the hexane soluble contaminants in an industrial waste water, the process of the present invention also removes other contaminants from the industrial waste water, for example, contaminating metals such as cadmium, copper, lead, iron, nickel and zinc. Apparently, these metals become associated with the calcium hydroxide floc at a pH of 11.6 or higher so that these metals are removed in an amount and in a manner similar to the removal of the hexane solubles.

To determine the minimum pH required to effectively remove hexane soluble contaminants from a contaminated industrial waste water, raw waste water having a hexane soluble content of 1,042 milligrams per liter, 9.34 milligrams per liter iron and 5.79 milligrams per liter lead was adjusted to various pH levels by the addition of sodium hydroxide and the same quantity of $CaCl_2$ and coagulant (polyacrylamide having an average molecular weight of four million) was added to each sample. To each sample having a different pH, $CaCl_2$ was added in an amount of 4,000 milligrams per liter of water with gentle stirring for 3 minutes followed by the addition of the polyacrylamide coagulant in an amount of 2 milligrams per liter of water with gentle sitrring for another 3 minutes. After the mixture was allowed to settle for 30 minutes, the supernatant liquid (clarified waste water) was decanted and analyzed for hexane solubles, iron and lead. The data set forth in TABLE I shows that a sharp drop in remaining hexane solubles begins at a pH of 11.6:

TABLE I

| pH of Industrial Waste Water | 10.0 | 10.2 | 10.4 | 10.6 | 10.8 | 11.0 | 11.2 | 11.4 | 11.6 | 11.8 | 12.0 | 12.2 | 12.4 | Raw Waste Water (mg./l.) |
|---|---|---|---|---|---|---|---|---|---|---|---|---|---|---|

TABLE I-continued

| | | | | | | | | | | | | | | |
|---|---|---|---|---|---|---|---|---|---|---|---|---|---|---|
| Hexane Solubles (mg./l.) | 52.0 | 60.0 | 56.0 | 64.0 | 54.0 | 56.0 | 60.0 | 54.0 | 60.0 | 36.0 | 26.0 | 22.0 | 22.0 | 1042.0 |
| Iron-Total (mg./l.) | 0.18 | 0.26 | 0.20 | 0.30 | 0.30 | 0.42 | 0.30 | 0.26 | 0.30 | 0.30 | 0.30 | 0.30 | 0.30 | 9.34 |
| Lead-Total (mg./l.) | 0.39 | 0.38 | 0.13 | 0.12 | 0.13 | 0.26 | 0.24 | 0.13 | 0.11 | 0.13 | 0.12 | 0.12 | 0.13 | 5.79 |

To determine the minimum amount of $CaCl_2$ required to form sufficient floc for effective removal of the hexane soluble contaminants five samples of the contaminated waste water of TABLE I were adjusted in pH value to an effective pH of 11.6 by the addition of sodium hydroxide and varied amounts of $CaCl_2$ added with gentle stirring for 3 minutes. After the $CaCl_2$ addition a polyacrylamide coagulant having an average molecular weight of 4 million was added to each sample in an amount of 2 milligrams per liter of contaminated waste water, with gentle stirring for 3 minutes. The treated waste water was allowed to settle for 30 minutes whereupon the supernatant liquid (clarified waste water) was decanted and analyzed for hexane solubles, iron and lead. At about 1,700 parts per million of $CaCl_2$ the hexane soluble content fell to an acceptable level below 100 milligrams per liter:

TABLE II

| $CaCl_2$ (p.p.m.) | 1500 | 1700 | 2000 | 2500 | 4000 |
|---|---|---|---|---|---|
| Hexane Solubles (mg./l.) | 114.0 | 97.0 | 84.0 | 76.0 | 60 |
| Iron-Total (mg./l.) | 0.31 | 0.20 | 0.11 | 0.14 | 0.11 |
| Lead (mg./l.) | 0.24 | 0.19 | 0.13 | 0.06 | 0.30 |

BRIEF DESCRIPTION OF THE DRAWING

FIG. 1 is a schematic view of the industrial waste water process of the present invention.

FIG. 2 is a graph illustrating hexane solubles vs. pH.

DETAILED DESCRIPTION OF THE PREFERRED EMBODIMENT

Referring now to the drawings, and initially to FIG. 1, influent industrial waste water containing oil and grease (water-insoluble and hexane-soluble) impurities enters mixing vessel 12 through conduit 14 and valve 16. In mixing vessel 12, the pH of the influent industrial waste water is adjusted to a value of at least 11.6 by the addition of a suitable base, such as sodium hydroxide, through conduit 18. Calcium chloride is also added through conduit 18 to produce a calcium hydroxide floc in mixing tank 12 at a pH of 11.6 or higher. While it is preferred to add an alkaline metal hydroxide as the basic substance to increase the pH to 11.6 or higher, it is to be understood that any chemical which increases the hydroxide-ion concentration when added to water is suitable to increase the pH of the industrial waste water to a value of at least 11.6 and to provide sufficient hydroxide ions for reaction with calcium chloride to provide the calcium hydroxide floc. Sufficient base should be added so that after floc formation, the pH of the treated waste water in mixing vessel 12 is at least 11.6.

In the preferred embodiment, the mixing vessel 12 includes two elongated mixing chambers 20 and 22 separated by a vertical overflow weir 24 so that chambers 20 and 22 provide two separate mixing stations. Mixing chamber 20 assures complete and homogeneous mixing of the base and the calcium chloride in the influent industrial waste water. Each of the separate chambers 20 and 22 includes a plurality of generally horizontally disposed baffles 26 in spaced arrangement to provide a tortuous path of travel for the influent waste water so that the waste water is completely and homogeneously treated with the added chemicals before leaving the mixing vessel 12. The influent waste water treated with a base and with calcium chloride exits chamber 20 over weir 24 through conduit 28 and into a substantially vertical conduit 30 in mixing chamber 22.

The waste water entering mixing chamber 22 contains a substantial quantity of calcium hydroxide floc and in chamber 22 this floc is agglomerated or coagulated by the addition of a suitable coagulant at conduit 30. The baffles 26 in chamber 22 provide a tortuous path of travel to assure that the floc containing waste water entering chamber 22 is completely and homogeneously contacted with the coagulant to provide complete agglomeration of the calcium hydroxide floc before the treated waste water leaves chamber 22 through conduit 32.

The treated waste water leaving mixing vessel 12 through conduit 32 enters an L-shaped holding tank 34 having an elongated base or leg portion 36. The base portion 36 of holding tank 34 extends into a bottom portion of a floatation vessel, indicated generally by reference numeral 40, and is in fluid communication therewith. In the base portion 36 of holding tank 34, the clumps or agglomerates of calcium hydroxide floc, having oil or grease and metal impurities incorporated therein or attached thereto, are contacted with microscopic air bubbles which attach to the floc clumps. The floc clumps having bubbles attached thereto leave the base portion 36 of holding tank 34 through sludge exit aperture 44 and rise in a floc floatation chamber 46 of floatation vessel 40. A substantially vertical weir 48 separates the floc floatation chamber 46 from an effluent settling chamber 50 of floatation vessel 40. The treated effluent flows over weir 48 and into the effluent settling chamber 50 of floatation vessel 40. The bubbles and contained floc clumps rise to the surface of floatation vessel 40 in floc floatation chamber 46 and sediment settling chamber 50.

The floc clumps captured by air bubbles are skimmed from the surface of floatation vessel 40 with a suitable surface skimming apparatus having slightly submerged surface skimming blades 54. The blades 54 push the clumps over wall 56 of floatation vessel 40 so that the clumps can be collected and suitably disposed of. A bottom wall 58 of settling chamber 50 is preferably inclined so that sediment collecting on the bottom wall 58 in settling chamber 50 will flow by gravity to a collection chamber 60. The sediment can be removed periodically from collection chamber 60 through conduit 62 by opening valve 64.

The clarified effluent containing little or no floc flows under a vertical weir 66 into a clarified effluent chamber 70 of floatation vessel 40. The vertical weir 66 is located in an upper portion of floatation vessel 40 to prevent the floating floc agglomerates from entering the clarified effluent chamber 70. From the clarified effluent chamber 70 the treated industrial waste water flows over a vertical weir 72 and the clear waste water can be adjusted in pH by the addition of a suitable acid such as sulfuric acid, carbonic acid or $CO_2$ to a suitable value for legal discharge into a sewer or stream through outlet conduit 74.

The microscopic air bubbles used to float the floc clumps by attaching to the floc clumps in base portion 36 of holding tank 34 and in floc floatation chamber 46 of floatation vessel 40 can be provided in any suitable manner. In a preferred embodiment, as shown in FIG. 1, clarified effluent is recycled from a bottom portion of the floatation vessel 40 by pumping a portion of the clarified effluent through conduit 76 and valve 78 by a suitable liquid pump 80. In a preferred embodiment the recycle rate can be in the range of 30-100% of the industrial waste water flow. The pump 80 pressurizes the recycled clarified effluent in conduit 82 on an outlet side of pump 80 to a suitable positive pressure, for example, 45 p.s.i. From conduit 82 the recycled effluent is conveyed into an air absorption tank 84 maintained at a suitable pressure of, for example, 5 p.s.i. less than the line pressure on the outlet side of pump 80, i.e. 40 p.s.i. The clarified effluent maintained under 40 p.s.i. pressure is maintained at a substantially constant liquid level by float 86 which may be operatively connected to pump 80 so that liquid is conveyed to air absorption tank 84 when the liquid level in tank 84 falls below a predetermined minimum and so that the pump shuts off at a predetermined maximum liquid level. Air bleed off valve 88 is provided to maintain a predetermined positive pressure within air absorption tank 84. Effluent from air absorption tank 84 passes through outlet conduit 89 and then through pressure reduction valve 90 to release a substantial quantity of microscopic bubbles as a result of the substantial pressure drop across the valve 90. The microscopic bubbles rise and are released from a substantially horizontal outlet leg 92 of conduit 93 in the base 36 of holding tank 34. The bubbles attach to the floc clumps in base portion 36 and in floatation chamber 50 to float the floc clumps to the surface of floatation vessel 40.

Any suitable pressurized air supply can be used to provide air at a positive pressure of, for example, 40 p.s.i. through conduit 94 leading into air absorption tank 84.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by Letters Patent of the United States is:

1. A method of clarifying an industrial waste water containing hexane soluble oil or grease comprising
    raising the pH of the waste water to a value of at least 11.6;
    adding calcium chloride to the waste water in an amount of at least 1,700 parts per million parts of waste water to flocculate a substantial portion of said oil or grease;
    adding a floc coagulant to said waste water to agglomerate said floc into clumps; and
    removing said floc clumps.

2. A method as defined in claim 1 wherein the calcium cloride is added in an amount sufficient to reduce the hexane soluble content of the waste water to a value of less than 100 milligrams per liter of waste water.

3. A method as defined in claim 1 wherein the calcium chloride is added in an amount sufficient to reduce the hexane soluble content of the waste water to a value of less than 50 milligrams per liter of waste water.

4. A method as defined in claim 1 wherein the floc coagulant is a polymer of acrylamide.

5. A method as defined in claim 1 wherein the floc clumps are removed by floc floatation and skimming the floc clumps from the surface.

6. A method as defined in claim 1 wherein the pH of the waste water is adjusted to a value of at least 11.8 prior to the addition of calcium chloride.

7. A method as defined in claim 6 wherein the pH of the waste water is adjusted to a value in the range of 11.8-12.4 prior to the addition of calcium chloride.

8. A method as defined in claim 1 wherein the coagulant is a water soluble polymeric electrolyte.

* * * * *